(12) United States Patent
Saijo et al.

(10) Patent No.: US 9,769,908 B2
(45) Date of Patent: Sep. 19, 2017

(54) AUDIO REPRODUCTION DEVICE

(71) Applicant: SONY CORPORATION, Tokyo (JP)

(72) Inventors: Nobuhiro Saijo, Tokyo (JP); Arinobu Ueda, Penang (MY)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/035,541

(22) PCT Filed: Nov. 28, 2014

(86) PCT No.: PCT/JP2014/005961
§ 371 (c)(1),
(2) Date: May 10, 2016

(87) PCT Pub. No.: WO2015/092984
PCT Pub. Date: Jun. 25, 2015

(65) Prior Publication Data
US 2016/0302285 A1  Oct. 13, 2016

(30) Foreign Application Priority Data

Dec. 18, 2013  (JP) ................... 2013-260786

(51) Int. Cl.
*H05B 37/00* (2006.01)
*H05B 37/02* (2006.01)
(Continued)

(52) U.S. Cl.
CPC ..... *H05B 37/0236* (2013.01); *F21V 33/0056* (2013.01); *G01H 9/00* (2013.01); *H04R 1/028* (2013.01); *H04R 3/04* (2013.01); *H04R 5/02* (2013.01); *H04R 9/06* (2013.01); *H04R 29/00* (2013.01); *H05B 33/0854* (2013.01); *H05B 33/0872* (2013.01); *F21Y 2101/02* (2013.01); *F21Y 2115/10* (2016.08); *H04R 5/04* (2013.01); *H04R 2420/09* (2013.01)

(58) Field of Classification Search
CPC ............ G06K 9/2018; G06K 9/00375; G06K 9/00355; G06K 9/00362; G06K 9/00255; G06K 9/00033; G06K 9/0061; G06K 9/209; H04R 1/028; H04R 5/02; H04R 1/02; H04R 2205/021; H04R 2201/403; H04R 2420/09
See application file for complete search history.

(56) References Cited

U.S. PATENT DOCUMENTS

2012/0120223 A1* 5/2012 Zuest ............... G02B 21/0008
                                                          348/79
2013/0225037 A1*  8/2013 Deluz ................. A63H 33/26
                                                          446/242

FOREIGN PATENT DOCUMENTS

JP      59-144983 A      9/1984
JP      59-169177 A     11/1984
(Continued)

*Primary Examiner* — Monica C King
(74) *Attorney, Agent, or Firm* — Chip Law Group (57) ABSTRACT

Provided is an audio reproduction device including: a light source provided in the vicinity of a speaker unit; a detection unit that detects a beat of an audio signal reproduced by the speaker, and outputs a detection signal corresponding to the beat; and a light emission control signal output unit that controls a light emission mode of the light source in accordance with the detection signal, and outputs a light emission control signal for allowing generation of white light for a short period at a peak of intensity of the light source.

6 Claims, 11 Drawing Sheets

(51) Int. Cl.

| | | |
|---|---|---|
| *F21V 33/00* | (2006.01) | |
| *H04R 1/02* | (2006.01) | |
| *H04R 5/02* | (2006.01) | |
| *G01H 9/00* | (2006.01) | |
| *H04R 3/04* | (2006.01) | |
| *H04R 9/06* | (2006.01) | |
| *H04R 29/00* | (2006.01) | |
| *H05B 33/08* | (2006.01) | |
| *H04R 5/04* | (2006.01) | |
| *F21Y 101/02* | (2006.01) | |
| *F21Y 115/10* | (2016.01) | |

(56) References Cited

FOREIGN PATENT DOCUMENTS

| JP | 09-247778 A | 9/1997 |
|---|---|---|
| JP | 2001-067053 A | 3/2001 |
| JP | 2005-189658 A | 7/2005 |
| JP | 2006-148503 A | 6/2006 |
| JP | 2008-141446 A | 12/2006 |
| JP | 2010-508626 A | 3/2010 |
| JP | 2012-513704 A | 6/2012 |
| WO | 2012/066855 A | 5/2012 |

\* cited by examiner

AUDIO REPRODUCTION DEVICE

CROSS REFERENCE TO RELATED APPLICATIONS

This application is a U.S. National Phase of International Patent Application No. PCT/JP2014/005961 filed on Nov. 28, 2014, which claims priority benefit of Japanese Patent Application No. JP 2013-260786 filed in the Japan Patent Office on Dec. 18, 2013. Each of the above-referenced applications is hereby incorporated herein by reference in its entirety.

TECHNICAL FIELD

The present disclosure relates to an audio reproduction device which performs a display function by using light emission elements.

BACKGROUND ART

Preference of a person in music considerably differs from region to region. For example, Japanese people in recent years reproduce music by using a speaker equipped with a dock for receiving a portable music player. Accordingly, Japanese people tend to prefer compact and simple design. One of possible reasons for this tendency is that the housing size in this country is generally small in comparison with the housing size in Western countries.

In South American countries, however, a large-sized speaker equipped with a decorative light source (such as a Light Emitting Diode (LED)) is more popular, and often used to reproduce music with a loud volume at a home party or the like. The applicant of the present application therefore has been offering products of large-sized speakers on the market to meet preference of such people.

There have been proposed various types of controls, including these actual products, performed in synchronization with reproduction of audio data. According to Patent Document 1 identified below, for example, a light source provided in the vicinity of a speaker is controlled based on illumination control parameters generated from audio data to be reproduced. For example, control for correlating a tempo of music and intensity of light is performed.

CITATION LIST

Patent Document

Patent Document 1: Japanese PCT National Publication No. 2010-508626

SUMMARY OF THE INVENTION

Problems to be Solved by the Invention

The technology described in Patent Document 1 has been developed with an aim of reproducing, even at home, realistic sensations experienced at a live music club or a clubhouse during reproduction of music. However, there are various differences between music reproduction at a live music club or a clubhouse and music reproduction at home. For example, intense illumination such as flashing light blinks in accordance with reproduction of music at a live music club or a clubhouse. In case of music reproduction at home, however, power for use is difficult to increase in consideration of costs, power consumption, and safety, in which condition illumination of the type at a live music club or a clubhouse is difficult to reproduce. When a light source such as an LED is added to a speaker device to avoid additional use of a separate light source, powerful illumination becomes more difficult due to a limitation imposed on the light amount of the LED or other conditions.

Accordingly, an object of the present disclosure is to provide an audio reproduction device capable of reproducing powerful illumination at home by using a light source attached to a speaker device to reproduce illumination providing realistic sensations experienced at a live music club or a clubhouse.

Solutions to Problems

The present disclosure is directed to an audio reproduction device including:
a light source provided in the vicinity of a speaker unit;
a detection unit that detects a beat of an audio signal reproduced by the speaker, and outputs a detection signal corresponding to the beat; and
a light emission control signal output unit that controls a light emission mode of the light source in accordance with the detection signal, and outputs a light emission control signal for allowing generation of white light for a short period at a peak of intensity of the light source.

Effects of the Invention

According to at least one embodiment, illumination in an atmosphere closer to powerful illumination of a live music club or a clubhouse is offered by using a light source attached to a speaker device. Advantages to be offered are not limited to this advantage, but may be any of advantages described in the present disclosure. No limitation is imposed on interpretation of the contents of the present disclosure by the effects described below by way of example.

MODE FOR CARRYING OUT THE INVENTION

Embodiments according to the present disclosure are hereinafter described with reference to the drawings. The description is presented in the following order.
<1. First Embodiment>
<2. Second Embodiment>
<3. Third Embodiment>
<4. Modified Examples>

The respective embodiments presented by way of preferred specific examples of the present disclosure are given various limitations considered as preferable from technical views. However, no limitation is imposed on the scope of the present disclosure by these embodiments unless specified otherwise in the description of the present disclosure presented hereinbelow.

1. First Embodiment

[Configuration Example of Reproduction Device]

Figure 1:
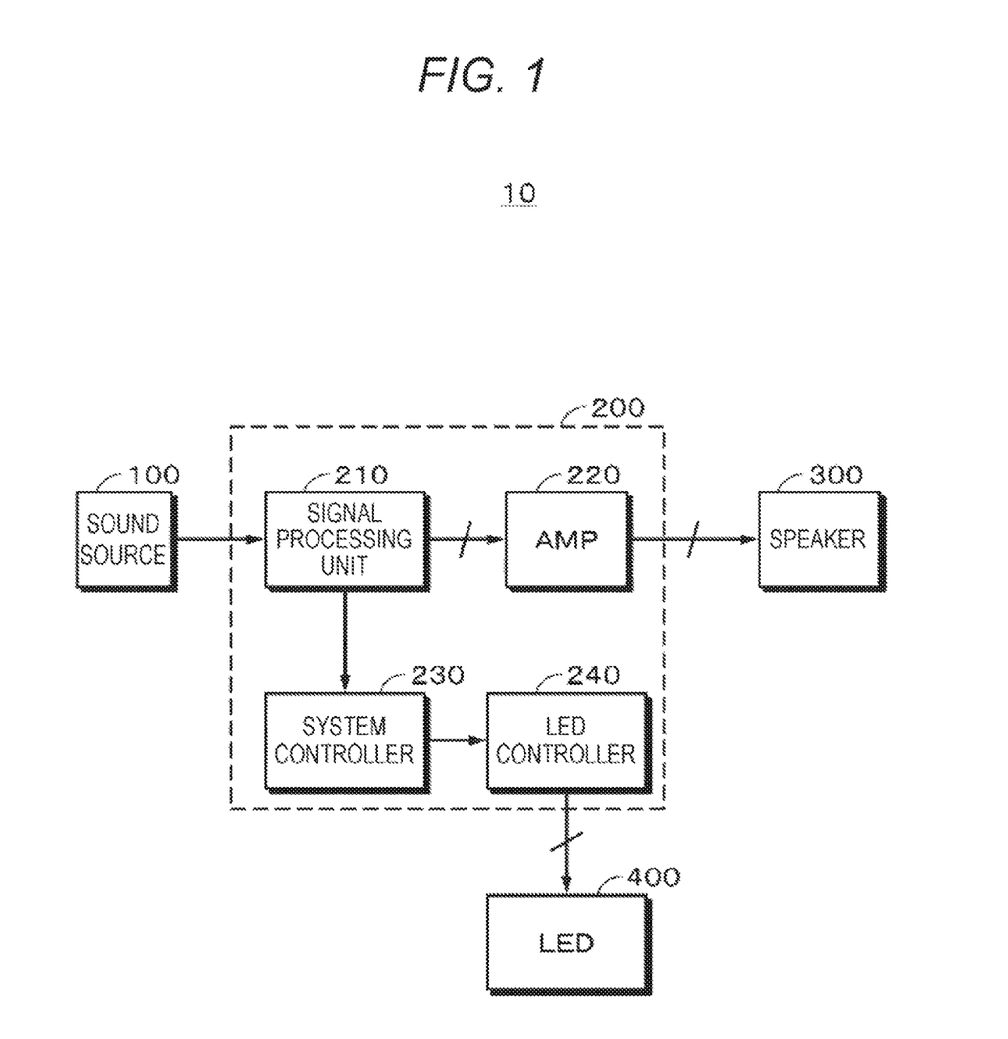
FIG. 1 is a block diagram illustrating a configuration example according to a first embodiment of the present disclosure.

FIG. 1 illustrates a configuration example of a reproduction device according to a first embodiment of the present disclosure. The reproduction device according to the first embodiment is a stationary audio reproduction device for reproducing sounds, for example. Sounds may be voices of a person, music or others allowed to be heard by the ears of a person. An audio reproduction device 10 includes a sound source 100, a control unit 200, a speaker 300, and a Light Emitting Diode (LED) 400. As described below, the LED 400 is provided in the vicinity of a speaker unit of a speaker 300.

The sound source 100 includes digital audio signals stored in a Universal Serial Bus (USB) memory, audio signals reproduced from a disk-shaped recording medium such as a Compact Disk (CD), and broadcasting audio signals received by a tuner, for example.

The control unit 200 includes a signal processing unit 210, an amplifier (AMP) 220, a system controller 230, and an LED controller 240.

The signal processing unit 210 is constituted by a Digital Signal Processor (DSP), for example. The signal processing unit 210 executes various types of signal processing, such as decoding for compressed audio data. The signal processing unit 210 performs a music analysis function which corresponds to processing according to the embodiment of the present disclosure. The music analysis function is a function for detecting a beat of a digital audio signal received from the sound source 100, and outputting a timing signal synchronous with the timing of the detected beat. For example, frequencies of audio data are analyzed by utilizing Fourier analysis to extract low frequency components. A beat is detected from gains of the extracted low frequency components. The method for detecting a beat may be other known methods. A typical beat is constituted by a bass beat. However, a beat in the context of the present disclosure has a meaning similar to the meaning of a rhythm or musical time. The timing signal generated by the signal processing unit 210 is supplied to the system controller 230 as a trigger signal.

The system controller 230 performs a plurality of functions under programs stored in a not-shown ROM, for example, and generates control signals for controlling respective units of the audio reproduction device 10. Moreover, various types of operation signals input through a not-shown user interface (key switch, touch panel or the like) are supplied to the system controller 230.

The system controller 230 controls respective units of the audio reproduction device 10, and generates a control signal for controlling a light emission mode of the LED 400. The system controller 230 generates the control signal in response to a trigger of a timing signal input from the signal processing unit 210. Specific light emission patterns of the LED 400 are stored in the ROM connected with the system controller 230, for example. The specific light emission patterns of the LED 400 may be stored in a rewritable memory for update of the light emission patterns.

The LED controller 240 generates a light emission control signal for controlling timing of light emission or non-emission from the LED 400, and brightness (intensity) of light at the time of emission in response to the control signal received from the system controller 230. The light emission control signal output from the LED controller 240 is supplied to the LED 400 containing a plurality of LEDs. Intensity of the LED 400 varies in accordance with the light emission control signal.

The LEDs contained in the LED 400 are not limited to monochromatic LEDs, but may be multicolor LEDs emitting lights in a plurality of colors. In case of a structure capable of emitting multicolor lights, the color of emission light may be switched between respective colors. The LED 400 according to the first embodiment contains a high-luminance white LED, and LEDs generating lights in a plurality of colors, such as three primary color lights (referred to as multicolor LEDs as appropriate).

The amplifier 220 amplifies analog audio signals of a plurality of channels output from the signal processing unit 210. The analog audio signals output from the amplifier 220 are supplied to the speaker 300 to reproduce sounds through the speaker 300.

[Example of External Appearance of Audio Reproduction Device]

Figure 2:
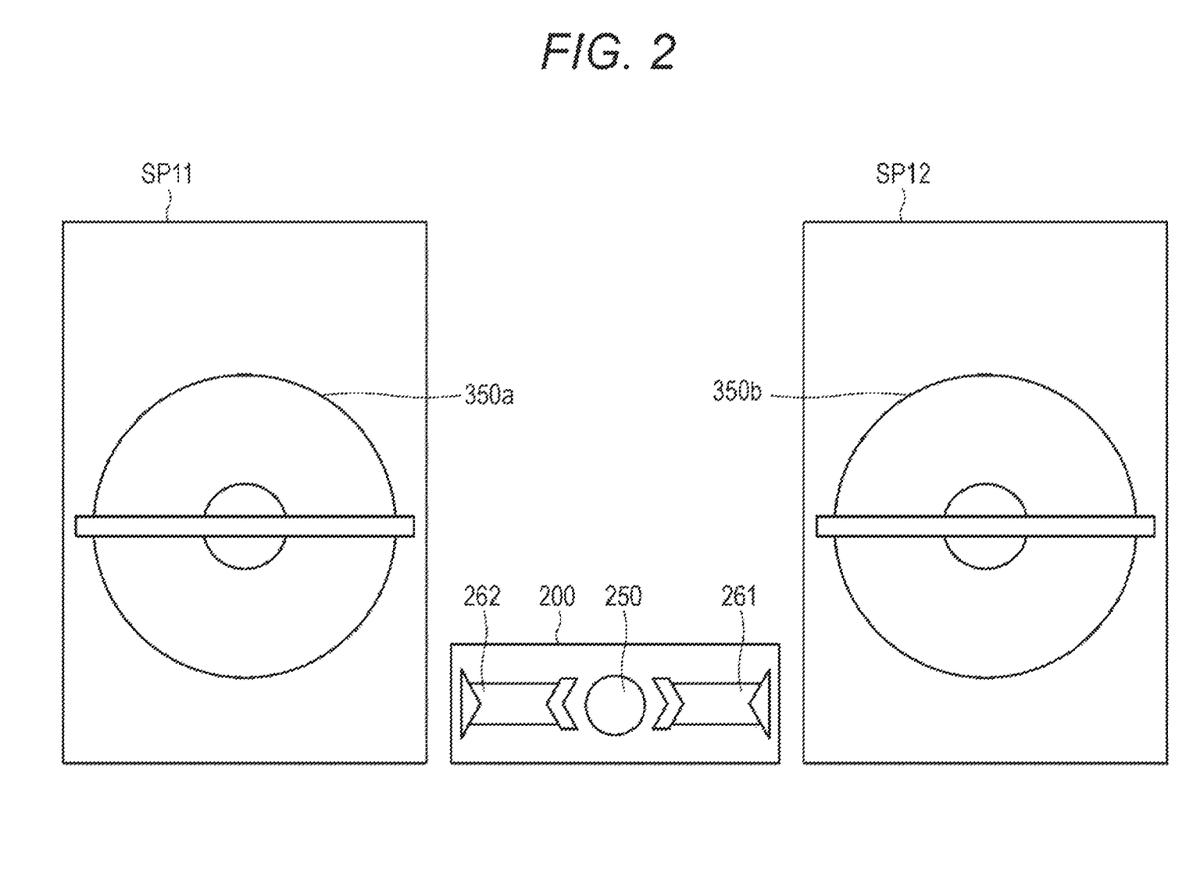
FIG. 2 is a front view illustrating an external appearance according to the first embodiment of the present disclosure.

The audio reproduction device 10 is disposed as illustrated in FIG. 2, for example. Two speakers SP11 and SP12 of the speaker are arranged on the left side and the right side, respectively, while the control unit 200 is disposed substantially at the center of the arrangement of the speakers, for example. LEDs provided on the control unit 200 are not shown in the figure. Full-range speaker units 350a and 350b are provided on the speakers SP11 and SP12, respectively. The speaker SP11 reproduces sounds of a left (L) channel. The speaker SP12 reproduces sounds of a right (R) channel.

Figure 3:
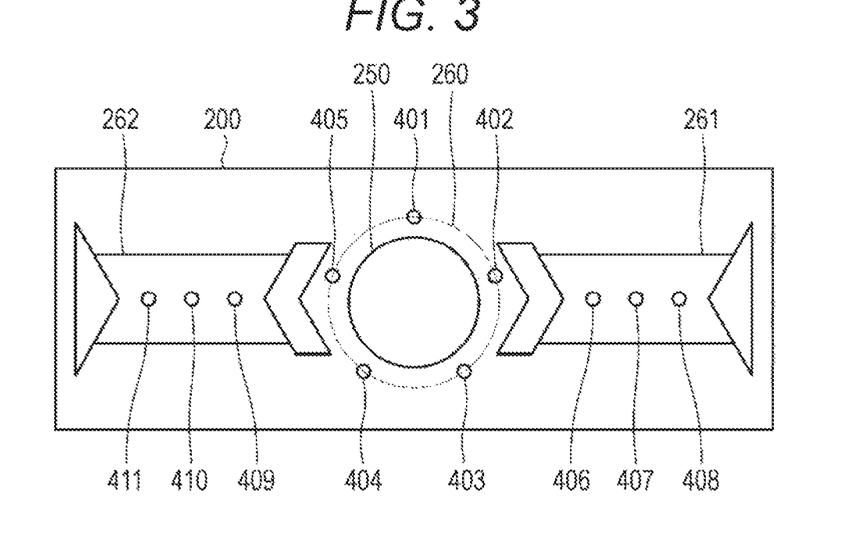
FIG. 3 is a front view illustrating an example of a control unit according to the first embodiment of the present disclosure.

As illustrated in FIG. 3, a volume control 250 is provided in a central portion of a front panel of the control unit 200. A ring-shaped light emission unit 260 is provided along the outer circumference of the volume control 250. The ring-shaped light emission unit 260 is constituted by a plurality of LEDs (such as five LEDs 401, 402, 403, 404, and 405), and a light guide body. Band-shaped light emission units 261 and 262 are further provided on the left and right areas of the volume control 250, respectively. The light emission unit 261 is constituted by a plurality of linearly arranged LEDs (such as three LEDs 406, 407, and 408), and a light guide body. The light emission unit 262 is constituted by a plurality of linearly arranged LEDs (such as three LEDs 409, 410, and 411), and a light guide body.

A light emission mode of the LEDs included in the control unit 200 may be arbitrarily set. For example, the five LEDs constituting the ring-shaped light emission unit 260 may emit light either sequentially or at a time. Similarly, the LEDs constituting the light emission unit 261 and the light emission unit 262 may emit light either sequentially in one direction, or at a time.

There may be further provided not-shown power source switch, bass boost switch, USB memory attachment portion and the like on the front surface or back surface of the control unit 200.

Figure 4:
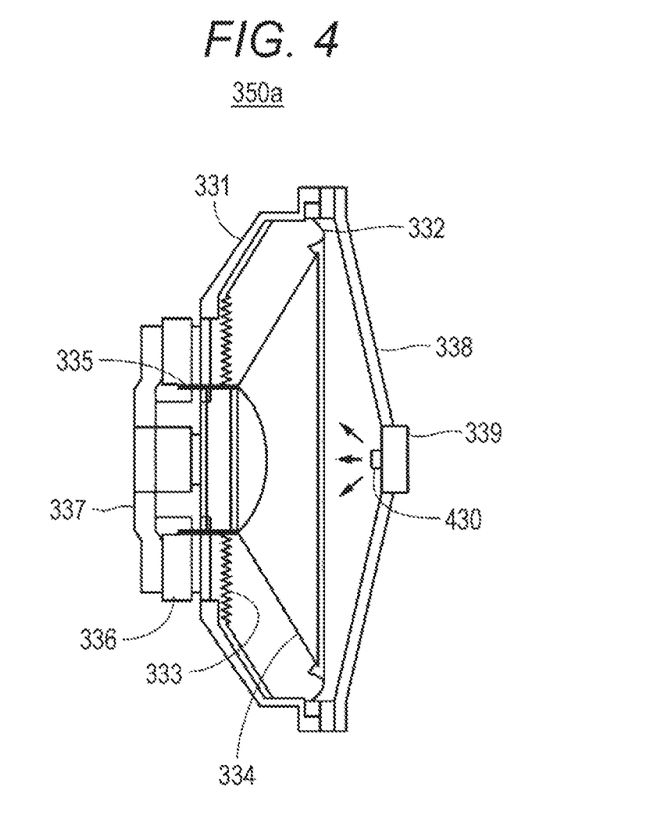
FIG. 4 is an outlined line view illustrating a configuration of a speaker according to the first embodiment of the present disclosure.

Each of the speakers SP11 and SP12 is constituted by an outer magnetic type dynamic speaker, for example. The speaker unit 350a of the speaker SP11 has a configuration illustrated in FIG. 4. Described hereinbelow is a configuration example of the speaker unit 350a, which is also applicable to the configuration of the speaker unit 350b. As illustrated in FIG. 4, a diaphragm (cone paper) 334 is attached to a frame 331 via an edge 332 and a damper 333. A voice coil 335 is provided at a base portion of the diaphragm 334. The voice coil 335 is positioned at a magnetic gap formed by a ring magnet 336 and a yoke 337. The voice coil 335 shifts in response to an audio signal, and vibrates the diaphragm 334 to reproduce music.

A front frame 338 provided on the front surface of the speaker unit 350a radially extends, while an LED 430 is attached to the rear surface of a plate 339 provided substantially at the center of the front frame 338. The LED 430 constitutes a part of the LED 400. Light emitted from the LED 430 is applied to the diaphragm 334 in a direction from the front. The diaphragm 334 made of material mixed with mica or other high reflection materials has high reflectance. Accordingly, light emitted from the LED 430 is reflected on the diaphragm 334 toward the front to display the speaker SP1 as a bright component.

As described above, the LED 430 includes the high-luminance white LED, and the multicolor LEDs generating lights in a plurality of colors such as three primary colors. Alternatively, the LED 430 may be constituted by a light emission element other than an LED.

Figure 5:
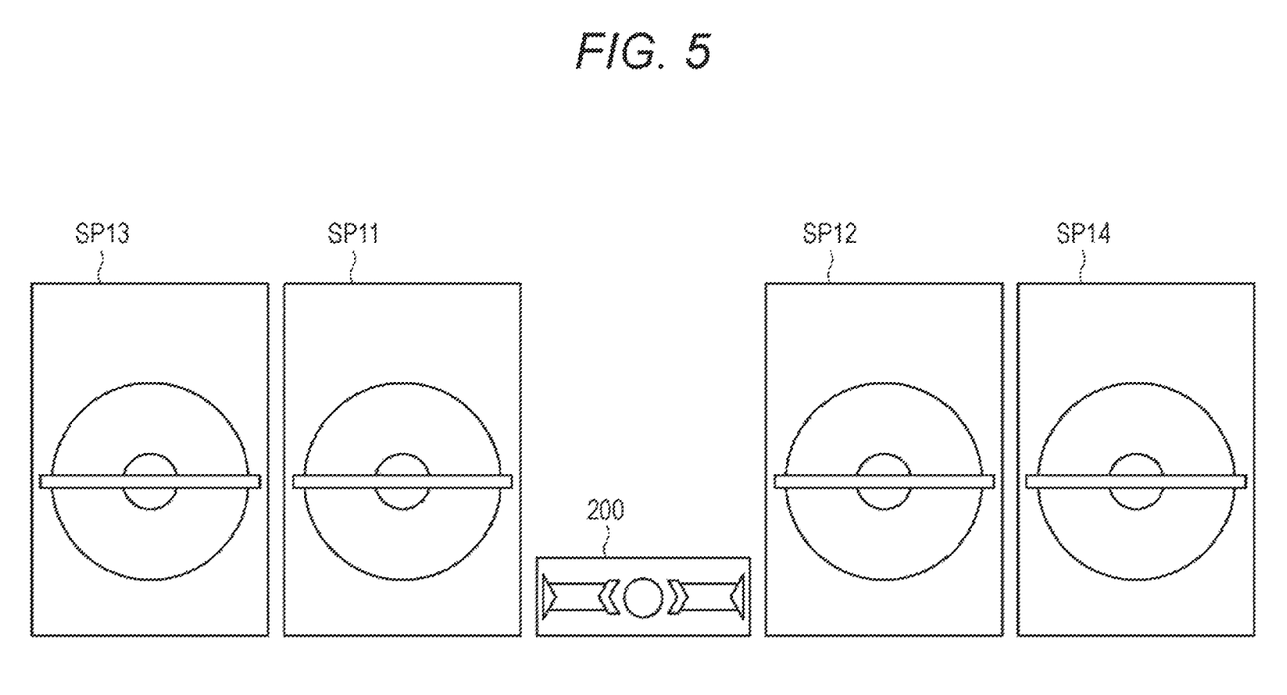
FIG. 5 is a front view illustrating another example of speaker arrangement according to the first embodiment of the present disclosure.

As illustrated in FIG. 5, two speakers of the speaker S11 and a speaker SP13 on the left side of the control unit 200, and two speakers of the speaker SP12 and a speaker SP14 on the right side of the control unit 200 may be arranged in a horizontal line. For example, the speakers SP11 and SP12 may reproduce a low range, while the speakers SP13 and SP14 may reproduce middle and high ranges. A larger number of speakers may be arranged, or two speakers may be stacked in the vertical direction.

A light emission control signal is generated to control a light emission pattern of the LED 400 provided on each of the plurality of speakers. The light emission control signal is a signal constituted by a plurality of continuous signals for specifying the light emission pattern of the LED 400 (referred to as short pattern as appropriate), which pattern continues for a predetermined period, such as 300, starting from the timing of a beat detection signal. The short pattern is regarded as a light emission pattern defined beforehand, and stored as digital data in the ROM, for example. The short pattern is specified based on intensity of the LEDs provided on each of the speaker units at the time of blinking and lighting.

Figure 6:
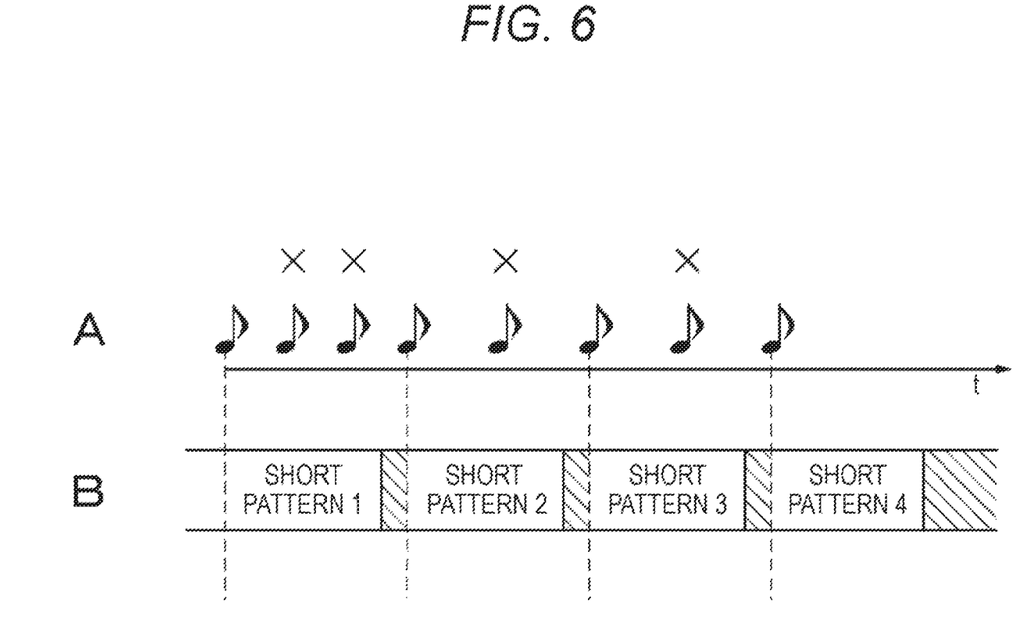
FIG. 6 is a timing chart describing a process according to the first embodiment of the present disclosure.

For example, a short pattern is presented as illustrated in FIG. 6. A part A in FIG. 6 shows beats to be detected. Respective marks of musical notes in the figure schematically indicate beats. However, the beat detection signal generated in signal processing is constituted by a pulse signal indicating a reference of timing. A part B in FIG. 6 shows short patterns to be presented. A short pattern 1 is presented in synchronization with a beat, and a short pattern 2 is presented in synchronization with a subsequent beat. Each display period of the short pattern 1, short pattern 2 and others is set to a substantially equivalent value, such as 300. The period from an end of a short pattern to a start of the subsequent pattern is determined as a period of non-emission or monochromatic light emission as indicated by diagonal lines. The timer starts with a start of each short pattern. When no beat is detected for 5 [sec] or more, for example, the display shifts to different display based on determination of timeout.

Beats detected during presentation of each short pattern are ignored as indicated by "X". These beats are ignored to avoid a loss of effect of display caused by switching of short patterns at excessively short intervals. It is preferable that the foregoing period of each short pattern is determined based on general characteristics of music to be reproduced. The period of each short pattern in this embodiment is determined in consideration of the fact that beats generated in a cycle shorter than 300 are relatively rare.

There are various specific examples of short patterns. In many cases, predetermined LEDs included in the multicolor LEDs emit light in synchronization with a beat detection signal. For example, as illustrated in a part A in FIG. 7, light is emitted in synchronization with a beat detection signal in a state that a predetermined color, such as a red LED, is set to maximum intensity Lm. Thereafter, this intensity is gradually decreased to come into a non-emission state. After an elapse of one pattern cycle tm, the red LED is again driven in a similar manner. The one pattern cycle tm corresponds to one cycle of the short pattern.

Figure 7:
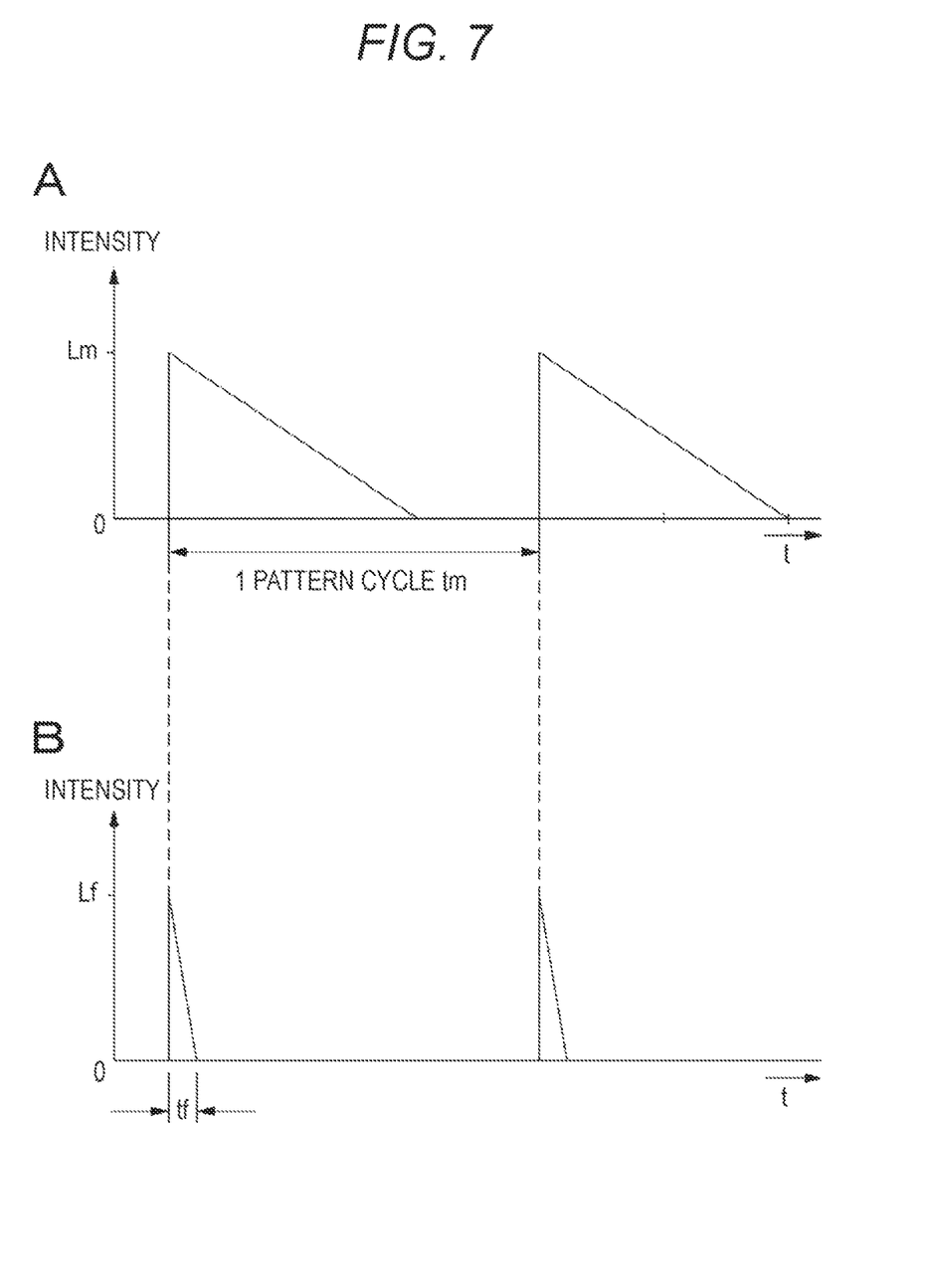
FIG. 7 is a waveform chart describing an example of a process according to the first embodiment of the present disclosure.

On the other hand, a high-luminance white LED provided on the identical speaker unit is driven as illustrated in a part B in FIG. 7. More specifically, the white LED is driven such that the intensity of the white LED increases to maximum intensity Lf at the timing of the rise of the red LED, and is turned off after lighting for a time tf sufficiently shorter than the one pattern cycle tm. It is preferable that the time tf is shorter than ⅓ of the one pattern cycle tm. For example, (tm=270 msec) and (tf=30 msec) are set.

Accordingly, the driving method for the LEDs realizes a state that each peak of the LEDs becomes maximum (or increases) at the same rising timing, and a state that the lighting period of the white LED becomes short. This driving method presents an expression of light capable of producing white saturation in the vicinity of the center of the diaphragm of the unit of the speaker, and exhibiting a red color toward the circumference of the diaphragm. White flashing light in the vicinity of the center of the diaphragm applied in this manner produces a residual image of the flash light. In this case, the emitted light gives an impression of intense light in appearance, and thereby achieves powerful illumination similarly to illumination of a live music club or a clubhouse. However, when the white LED is driven for a period equivalent to the period of lighting of the red LED, the entire reflection plate is blurred in pale red and does not give an impression of intense light. The change of intensity in the shape of a saw-tooth wave illustrated in the part A in FIG. 7 is applicable to the case of driving in a pulse waveform (square waveform).

Figure 8:
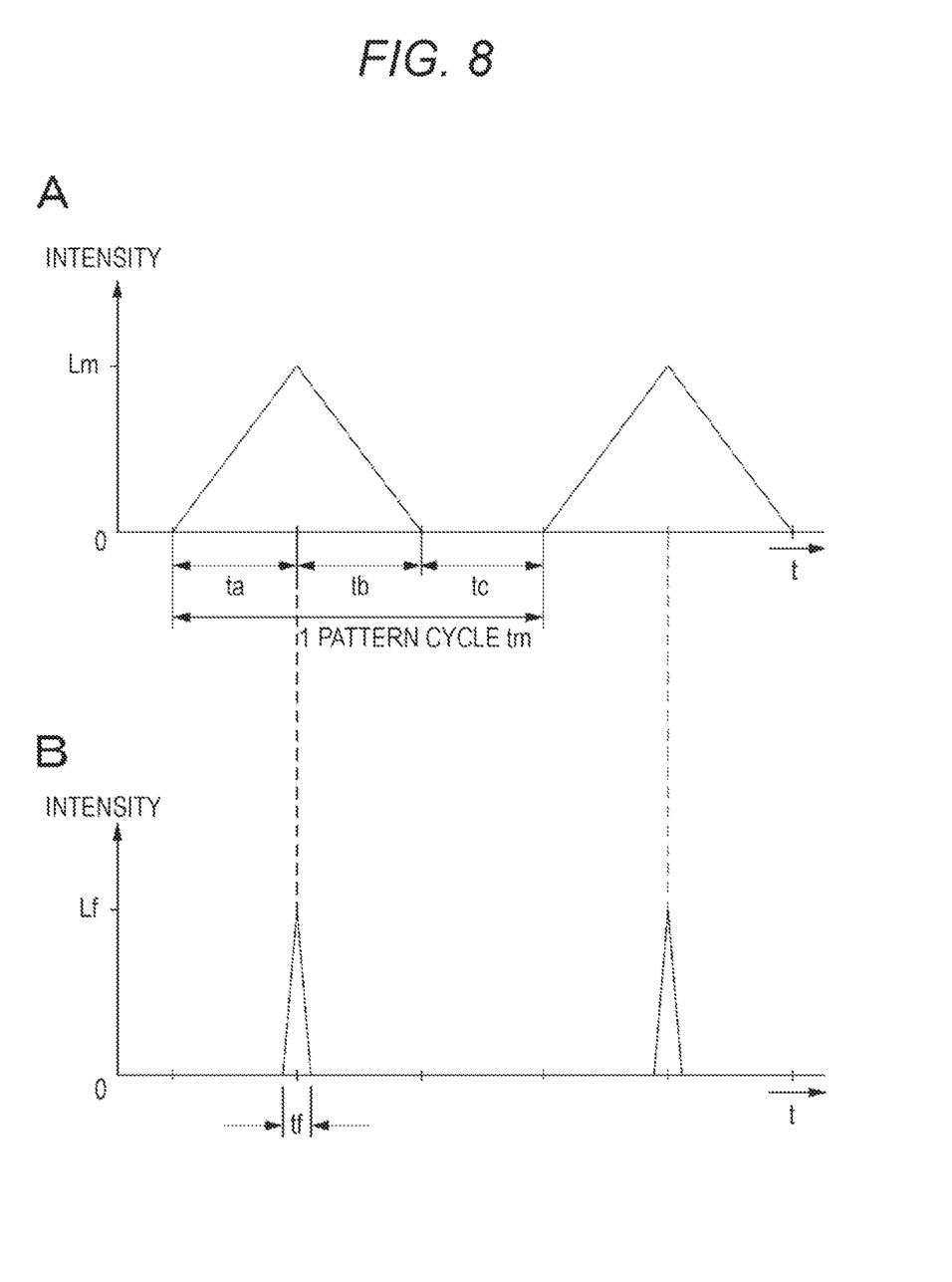
FIG. 8 is a waveform chart describing another example of the process, and an outlined line view illustrating a second example of a short pattern according to the first embodiment of the present disclosure.

A part A in FIG. 8 illustrates another example of the driving method of the multicolor LEDs. Luminance of a predetermined color of the multicolor LEDs, such as the red LED, gradually increases in a period ta to reach the maximum luminance, and gradually lowers to minimum luminance (non-emission) in a subsequent period tb. In a period tc, the LEDs do not emit light. These changes of the periods ta, tb, and tc are repeated. For example, the rising timing is synchronized with a timing signal.

According to this driving method, intensity of the white LED becomes the maximum at the timing coinciding with the timing of the maximum intensity of the red LED, while the lighting period of the white LED further decreases as illustrated in a part B in FIG. 8. This driving method similarly produces intense light in appearance.

2. Second Embodiment

According to the first embodiment, the speaker unit is provided with both the multicolor LEDs and the high-luminance white LED. Discussed in the second embodiment is an example provided with only the multicolor LEDs.

A light emission control method according to the second embodiment is hereinafter described with reference to FIG. 9. For example, intensity of a predetermined color, such as the red LED, is set to maximum intensity Lr in synchronization with a beat detection signal, and maintained at this intensity for a short period as illustrated in a part A in FIG. 9. Thereafter, the intensity of the red LED is gradually decreased to come into a non-emission state. After an elapse of one cycle, the red LED is again driven.

Figure 9:
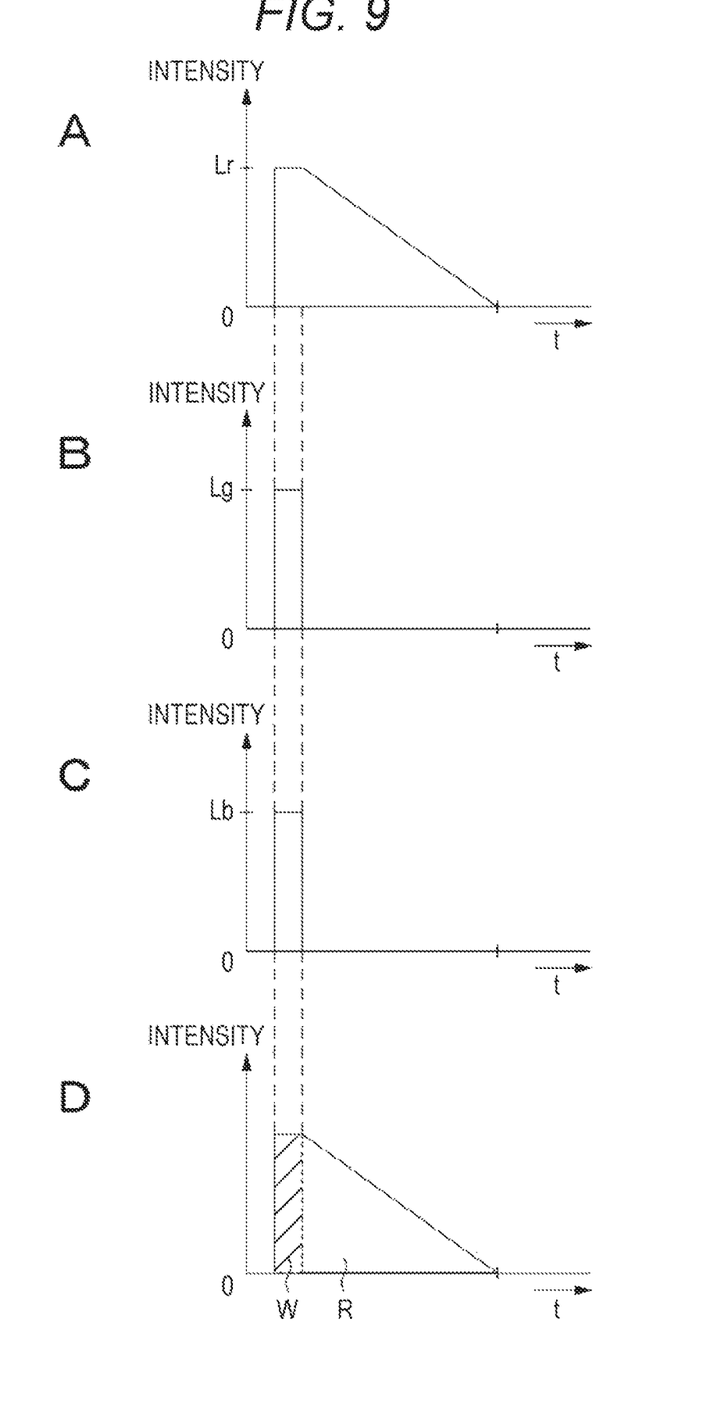
FIG. 9 is a waveform chart describing an example of a process according to a second embodiment of the present disclosure.

As illustrated in a part B and a part C in FIG. 9, respective rises of the green LED and the blue LED are synchronized with the rise of the red LED. The green LED and the blue LED are maintained at the maximum luminance for an equivalent period, and then turned off. A mixture of the lights of the LEDs in these three primary colors produces white light (indicated by shaded area W) for a short period as illustrated in a part D in FIG. 9. Thereafter, the white light becomes red light (indicated by area R).

According to the second embodiment, there is presented an expression of light capable of producing white saturation in the vicinity of the center of the diaphragm of the unit of the speaker, and a red color toward the circumference of the diaphragm. White flashing light in the vicinity of the center of the diaphragm applied in this manner produces intense light in appearance, and thereby offers an atmosphere of music reproduction in a live music club or a clubhouse. According to the example illustrated in FIG. 9, the LEDs of green and blue lights are turned off after an elapse of a short period for emission of red light. However, for illumination of a color other than red, such as yellow light, the green light is not turned off but continuously turned on similarly to the red light.

3. Third Embodiment

Figure 10:
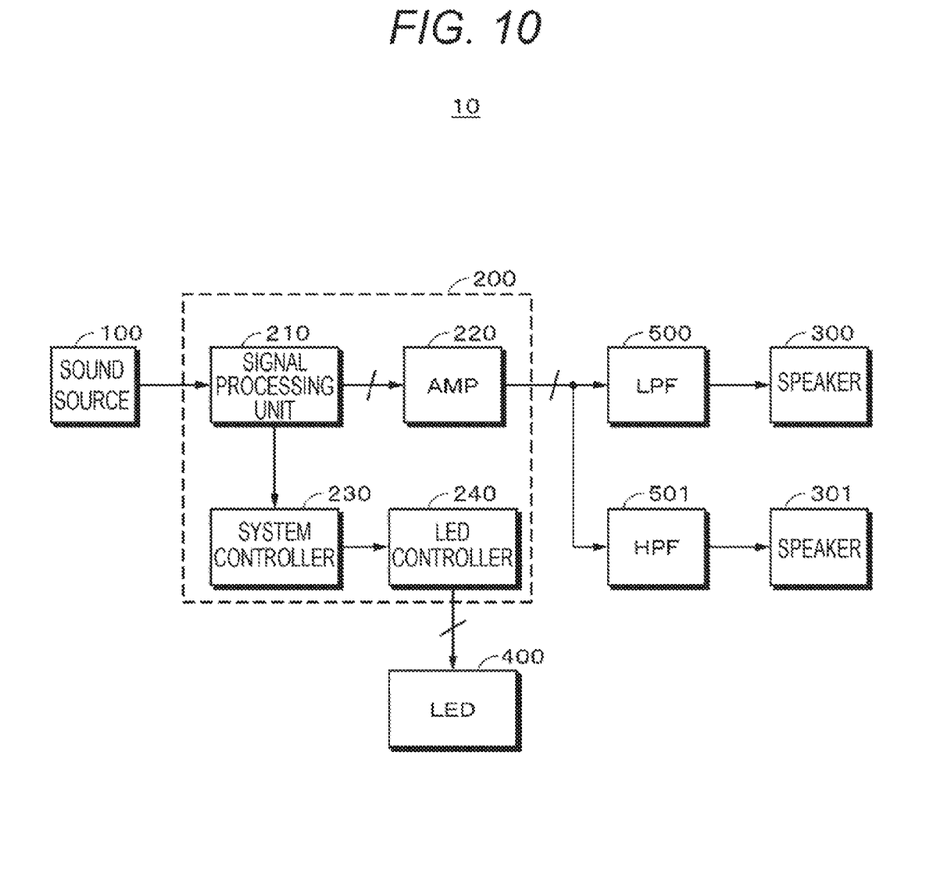
FIG. 10 is a block diagram illustrating a configuration example according to a third embodiment of the present disclosure.

Discussed in a third embodiment is an example which uses a plurality of types of speaker units, unlike the first embodiment which uses only the full-range speaker units. FIG. 10 illustrates an electric structure according to the third embodiment. The audio reproduction device 10 according to the third embodiment includes the sound source 100, the control unit 200, the speaker 300, a speaker 301, the Light Emitting Diode (LED) 400, a Low Pass Filter (LPF) 500, and a High Pass Filter (HPF) 501.

The control unit 200 includes the signal processing unit 210, the amplifier (AMP) 220, the system controller 230, and the LED controller 240 similarly to the first embodiment. The signal processing unit 210 generates a timing signal synchronous with the timing of a beat of a digital audio signal by using a music analysis function. The system controller 230 generates a light emission control signal for controlling the light emission mode of the LED 400. The light emission control signal output from the LED controller 240 is supplied to the LED 400 containing a plurality of LEDs. Luminance of the LED 400 varies in accordance with the light emission control signal.

The LPF 500 is a filter which regulates the band of analog audio signals received from the amplifier 220 to a range of predetermined frequencies or lower. The analog audio signals output from the LPF 500 are supplied to the speaker 300 to reproduce low range sounds through the speaker 300. The HPF 501 is a filter which regulates the band of analog audio signals received from the amplifier 220 to a range of predetermined frequencies or higher. The analog audio signals output from the HPF 501 are supplied to the speaker 301 to reproduce middle and high range sounds through the speaker 301.

[Example of External Appearance of Audio Reproduction Device]

Figure 11:
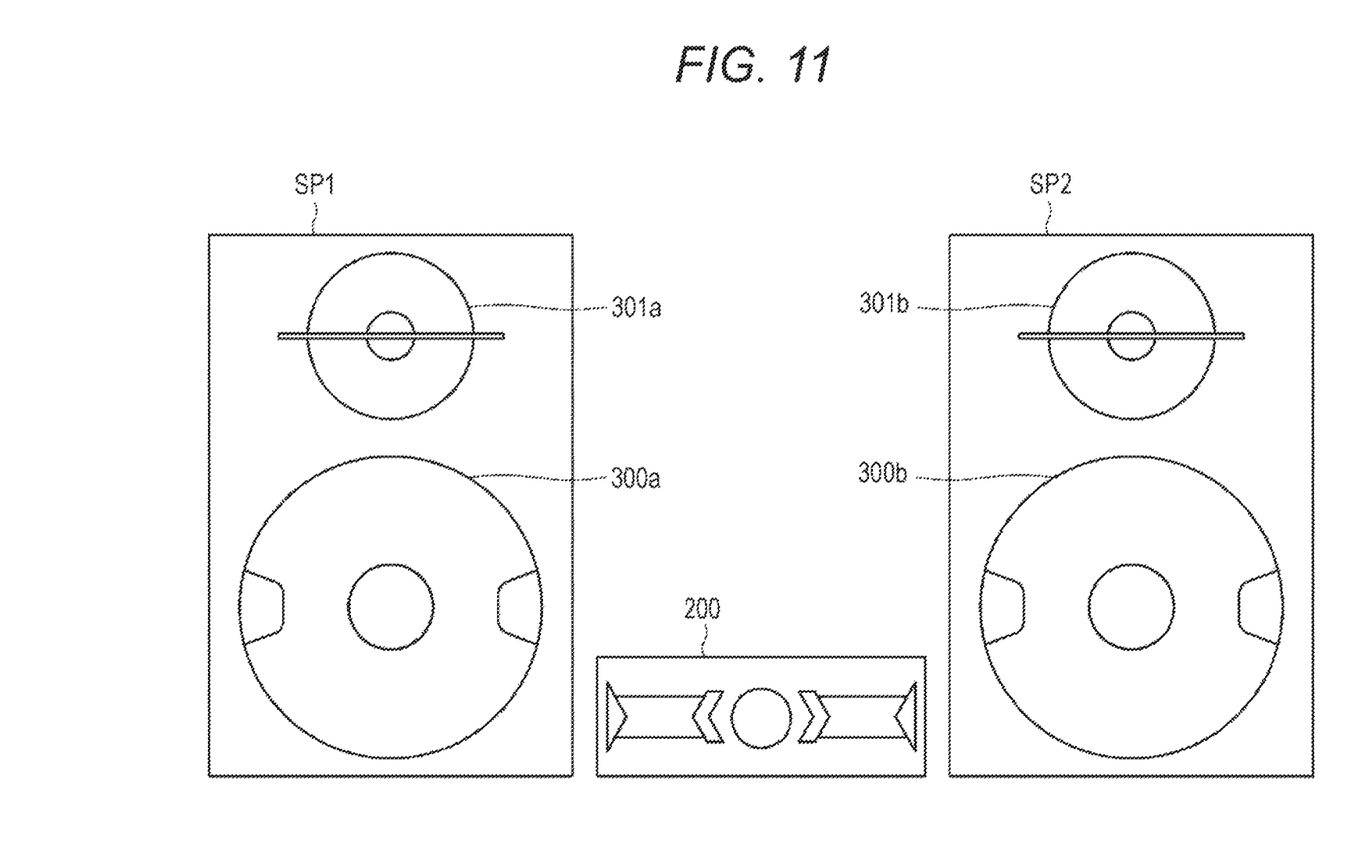
FIG. 11 is a front view illustrating an external appearance according to the third embodiment of the present disclosure.

The audio reproduction device 10 is disposed as illustrated in FIG. 11, for example. Two speakers SP1 and SP2 are arranged on the left side and the right side, respectively, while the control unit 200 is disposed substantially at the center of the arrangement of the speakers, for example. A speaker unit 300*a* of the speaker SP1 for low range reproduction, and a speaker unit 301*a* of the speaker SP1 for middle and high range reproduction are attached to a common enclosure. A speaker unit 300*b* of the speaker SP2 for low range reproduction, and a speaker unit 301*b* of the speaker SP2 for middle and high range reproduction are attached to a common enclosure. The control unit 200 is similar to the control unit 200 according to the first embodiment.

Figure 12:
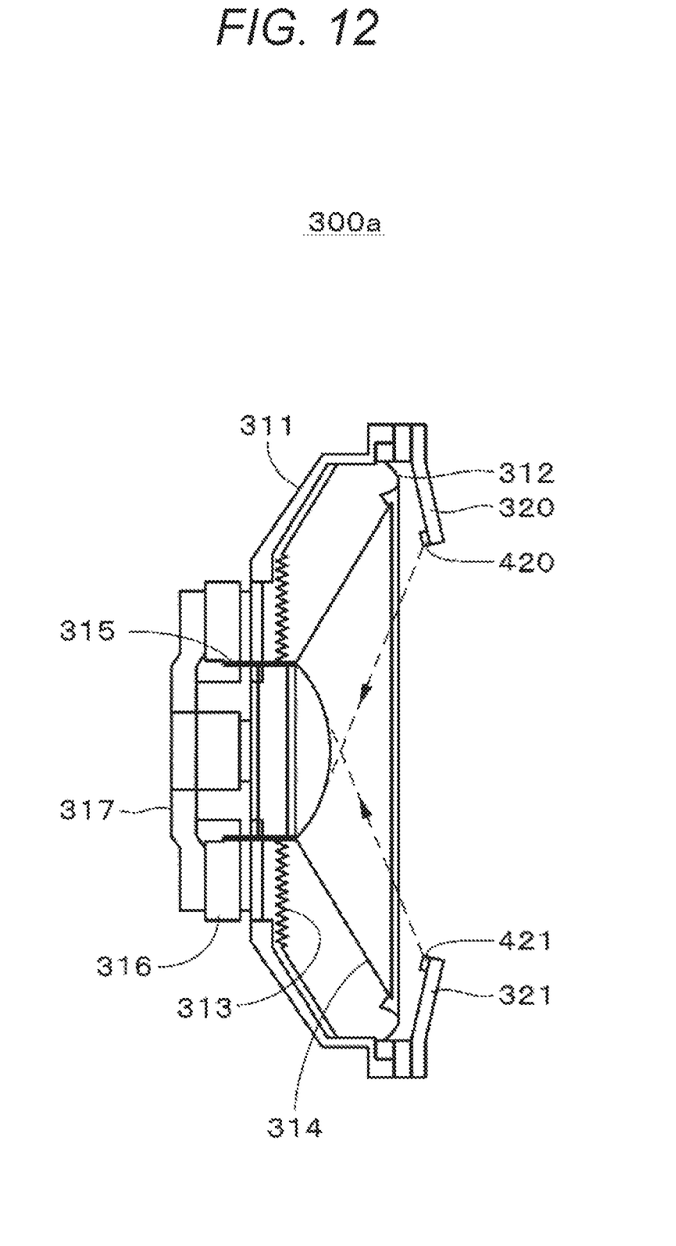
FIG. 12 is an outlined line view illustrating a configuration of a speaker according to the third embodiment of the present disclosure.

Each of the speakers SP1 and SP2 is constituted by an outer magnetic type dynamic speaker, for example. The speaker unit 300*a* of the speaker SP1 has a configuration illustrated in FIG. 12. Described hereinbelow is a configuration example of the speaker unit 300*a*, which is also applicable to the configuration of the speaker unit 300*b*. As illustrated in FIG. 12, a diaphragm (cone paper) 314 is attached to a frame 311 via an edge 312 and a damper 313. A voice coil 315 is provided at a base portion of the diaphragm 314. The voice coil 315 is positioned at a magnetic gap formed by a ring magnet 316 and a yoke 317. The voice coil 315 shifts in response to an audio signal, and vibrates the diaphragm 314 to reproduce music.

Two arms 320 and 321 project from an end of the speaker unit 300*a* toward the front of the speaker unit 300*a*. An LED 420 is attached to the tip of the arm 320, while an LED 421 is attached to the tip of the arm 321. The lights emitted from the LEDs 420 and 421 are directed to an area around the outer circumference of the diaphragm 314 as indicated by broken lines, for example. The diaphragm 314 made of material mixed with mica or other high reflection materials has high reflectance. Accordingly, light emitted from the LED 420 and the like is reflected on the diaphragm 314 toward the front to display the speaker unit 300*a* as a bright component.

Each of the LED 420 and the LED 421 includes the high-luminance white LED and the multicolor LEDs. Similarly to the first embodiment discussed above, the white LED emits light at the rising time coinciding with the timing of the light emission from the multicolor LEDs synchronized with a beat (timing signal). This control produces white flashing light applied to the vicinity of the center to generate intense light in appearance, and thereby offers an atmosphere of music reproduction in a live music club or a clubhouse.

Each of the speaker unit 301a and the speaker unit 301b on the high range side includes an arm radially crossing the front surface. An LED is attached to each of these arms similarly to the first embodiment (see FIG. 4). These LEDs are driven similarly to the LED 420 and the LED 421. However, the light emission mode of the LEDs 420 and 421 provided on the speaker units 300a and 300b on the low range side, and the light emission mode of the LEDs provided on the speaker units 301a and 301b on the high range side need not be equalized.

According to the third embodiment, the LEDs may be constituted only by the multicolor LEDs. In this case, intense light in appearance may be generated by controlling the multicolor LEDs similarly to the second embodiment. From the viewpoint of cost reduction, the light source of either the low range side speaker unit or the high range side speaker unit may be constituted by both the white LED and the multicolor LEDs, while the light source of the other speaker unit may be constituted only by the multicolor LEDs.

4. Modified Examples

While white light is emitted at the rising timing in the above description, slightly colored light, rather than white light, may be generated at the rising timing. When flashing light is generated from the multicolor LEDs at the rising, for example, slightly colored light may be produced depending on circumstances. Accordingly, white light to be generated in the present disclosure may be produced from a light source emitting substantially white light. For example, white light to be generated in the present disclosure may be produced from a light source regarded as a white light emitting light source, such as a so-called "diode for emitting blue-yellow pseudo white light" which produces visually white light by combining a fluorescent substance for emitting yellow light and a diode for emitting blue light, for example. The present disclosure is applicable to an audio reproduction device including a plurality of independent speakers for surround reproduction. The light emission elements may be elements other than LEDs. Supply of audio signals to the speakers and/or supply of driving signals to the LEDs may be realized via wireless communication.

The present disclosure is not limited to the respective embodiments specifically described herein, but may be modified in various ways in view of technical spirits of the present disclosure. For example, the configurations, methods, steps, shapes, materials, numerical values and others described in the foregoing embodiments are presented only by way of example. Configurations, methods, steps, shapes, materials, numerical values and others different from those described herein may be used as necessary.

The following configurations are adoptable according to the present disclosure.

(1) An audio reproduction device including:
a light source provided in the vicinity of a speaker unit;
a detection unit that detects a beat of an audio signal reproduced by the speaker, and outputs a detection signal corresponding to the beat; and
a light emission control signal output unit that controls a light emission mode of the light source in accordance with the detection signal, and outputs a light emission control signal for allowing generation of white light for a short period at a peak of intensity of the light source.

(2) The audio reproduction device according to (1), wherein the white light is generated for a period shorter than ⅓ of a lighting period of the light source.

(3) The audio reproduction device according to (1) or (2), wherein the light source illuminates a diaphragm of the speaker unit.

(4) The audio reproduction device according to (3), including an arm radially crossing a front surface of the speaker unit, wherein the light source is provided on the arm.

(5) The audio reproduction device according to (3), including a pair of support units disposed on a frame of the speaker unit at positions facing each other substantially at 180 degrees, wherein
a light source is provided on each of the support units, and
light emission directions of lights emitted from the respective light sources cross each other.

(6) The audio reproduction device according to any one of (1) through (5), wherein
the light source includes a first light source and a second light source,
the first light source generates the white light,
the second light source generates light in a color other than white, and
rising timing of the first light source for lighting is substantially equalized with rising timing of the second light source for lighting.

(7) The audio reproduction device according to any one of (1) through (5), wherein the light source generates lights in a plurality of colors, and forms the white light by mixing the lights in the plurality of colors.

REFERENCE SIGNS LIST

SP1, SP2, SP11 to SP14 Speaker
100 Sound source
200 Control unit
300, 301 Speaker
230 System controller
210 Signal processing unit
240 LED controller
334 Diaphragm
400 LED

The invention claimed is:

1. An audio reproduction device, comprising:
a light source in the vicinity of a speaker unit;
a detection unit configured to detect a beat of an audio signal reproduced by the speaker unit, and output a detection signal corresponding to the beat; and
a light emission control signal output unit configured to control a light emission mode of the light source based on the detection signal, and output a light emission control signal to allow generation of white light for a short period at a peak of intensity of the light source,
wherein the white light is generated for a period shorter than ⅓ of a lighting period of the light source.

2. The audio reproduction device according to claim 1, wherein the light source is configured to illuminate a diaphragm of the speaker unit.

3. The audio reproduction device according to claim 2, further comprising an arm that radially crosses a front surface of the speaker unit, wherein the light source is placed on the arm.

4. The audio reproduction device according to claim 2, further comprising
a pair of support units disposed on a frame of the speaker unit at a first position and a second position, wherein the first position faces the second position at 180 degrees, wherein a first light source is placed on a first of the pair of support units and a second light source is placed on a second of the pair of support units, and a first light emission direction of a first light emitted from the first light source crosses a second light emission direction of a second light emitted from the second light source.

5. The audio reproduction device according to claim 1, wherein the light source includes a first light source and a second light source, the first light source is configured to generate the white light, the second light source is configured to generate light in a color other than white, and a first rising timing of the first light source to light is equalized with a second rising timing of the second light source to light.

6. The audio reproduction device according to claim 1, wherein the light source is configured to generate lights in a plurality of colors, and generate the white light based on the lights that are mixed in the plurality of colors.

* * * * *